United States Patent
Feroz et al.

(10) Patent No.: US 8,031,601 B2
(45) Date of Patent: Oct. 4, 2011

(54) SLOW-START ADAPTIVE MECHANISMS TO IMPROVE EFFICIENCY OF BANDWIDTH ALLOCATION

(75) Inventors: Azeem Feroz, Cupertino, CA (US); Wei-Lung Lai, Cupertino, CA (US); James J. Stabile, Los Altos, CA (US)

(73) Assignee: Packeteer, Inc., Cupertino, CA (US)

( * ) Notice: Subject to any disclaimer, the term of this patent is extended or adjusted under 35 U.S.C. 154(b) by 0 days.

(21) Appl. No.: 12/188,239

(22) Filed: Aug. 8, 2008

(65) Prior Publication Data
US 2008/0298391 A1    Dec. 4, 2008

Related U.S. Application Data

(63) Continuation of application No. 10/810,785, filed on Mar. 26, 2004, now Pat. No. 7,426,181.

(51) Int. Cl.
*H04L 12/26* (2006.01)

(52) U.S. Cl. .................. 370/232; 370/231; 370/236

(58) Field of Classification Search ........... 370/229–236
See application file for complete search history.

(56) References Cited

U.S. PATENT DOCUMENTS

| | | | |
|---|---|---|---|
| 6,757,248 B1 | 6/2004 | Li et al. | |
| 6,757,255 B1 | 6/2004 | Aoki et al. | |
| 7,154,858 B1 | 12/2006 | Zhang et al. | |
| 7,218,610 B2 | 5/2007 | Sivakumar et al. | |
| 7,222,190 B2 | 5/2007 | Klinker et al. | |
| 7,239,611 B2 | 7/2007 | Khisti et al. | |
| 7,315,967 B2 * | 1/2008 | Azenko et al. | 714/704 |
| 7,472,159 B2 * | 12/2008 | Freimuth et al. | 709/203 |
| 7,551,560 B1 * | 6/2009 | Duong-van et al. | 370/232 |

* cited by examiner

*Primary Examiner* — Ricky Ngo
*Assistant Examiner* — Chandrahas PAtel
(74) *Attorney, Agent, or Firm* — Baker Botts L.L.P.

(57) ABSTRACT

Methods, apparatuses and systems directed to improving the efficiency of bandwidth allocation schemes by adapting to slow-start mechanisms associated with network communications protocols, such as the TCP/IP protocol suite. In one implementation, the present invention scales down the initial target rate assigned to a data flow to a fraction of an initial estimate of the effective rate capacity of the communications path between two hosts. As packets are received, the target rate is gradually increased, eventually up to the detected rate capacity of the communications path. Implementations of the present invention improve the efficiency of bandwidth allocation by reducing the over-allocation of bandwidth to data flows during the slow-start phase, leaving more bandwidth available to other data flows.

22 Claims, 7 Drawing Sheets

SLOW-START ADAPTIVE MECHANISMS TO IMPROVE EFFICIENCY OF BANDWIDTH ALLOCATION

CROSS-REFERENCE TO RELATED PATENTS AND APPLICATIONS

The present application is a continuation of U.S. patent application Ser. No. 10/810,785 filed Mar. 26, 2004, which is incorporated by reference herein for all purposes. This application also makes reference to the following commonly owned U.S. patent applications and patents, which are incorporated herein by reference in their entirety for all purposes:

U.S. patent application Ser. No. 08/762,828 now U.S. Pat. No. 5,802,106 in the name of Robert L. Packer, entitled "Method for Rapid Data Rate Detection in a Packet Communication Environment Without Data Rate Supervision;"

U.S. patent application Ser. No. 08/970,693 now U.S. Pat. No. 6,018,516, in the name of Robert L. Packer, entitled "Method for Minimizing Unneeded Retransmission of Packets in a Packet Communication Environment Supporting a Plurality of Data Link Rates;"

U.S. patent application Ser. No. 08/742,994 now U.S. Pat. No. 6,038,216, in the name of Robert L. Packer, entitled "Method for Explicit Data Rate Control in a Packet Communication Environment without Data Rate Supervision;"

U.S. patent application Ser. No. 09/977,642 now U.S. Pat. No. 6,046,980, in the name of Robert L. Packer, entitled "System for Managing Flow Bandwidth Utilization at Network, Transport and Application Layers in Store and Forward Network;"

U.S. patent application Ser. No. 09/106,924 now U.S. Pat. No. 6,115,357, in the name of Robert L. Packer and Brett D. Galloway, entitled "Method for Pacing Data Flow in a Packet-based Network;"

U.S. patent application Ser. No. 09/046,776 now U.S. Pat. No. 6,205,120, in the name of Robert L. Packer and Guy Riddle, entitled "Method for Transparently Determining and Setting an Optimal Minimum Required TCP Window Size;"

U.S. patent application Ser. No. 09/479,356 now U.S. Pat. No. 6,285,658, in the name of Robert L. Packer, entitled "System for Managing Flow Bandwidth Utilization at Network, Transport and Application Layers in Store and Forward Network;"

U.S. patent application Ser. No. 09/198,090 now U.S. Pat. No. 6,412,000, in the name of Guy Riddle and Robert L. Packer, entitled "Method for Automatically Classifying Traffic in a Packet Communications Network;"

U.S. patent application Ser. No. 09/198,051, in the name of Guy Riddle, entitled "Method for Automatically Determining a Traffic Policy in a Packet Communications Network;"

U.S. patent application Ser. No. 09/206,772, in the name of Robert L. Packer, Brett D. Galloway and Ted Thi, entitled "Method for Data Rate Control for Heterogeneous or Peer Internetworking;"

U.S. patent application Ser. No. 09/710,442, in the name of Todd Krautkremer and Guy Riddle, entitled "Application Service Level Mediation and Method of Using the Same;"

U.S. patent application Ser. No. 10/039,992, now U.S. Patent No. 7,032,072, in the name of Michael J. Quinn and Mary L. Laier, entitled "Method and Apparatus for Fast Lookup of Related Classification Entities in a Tree-Ordered Classification Hierarchy;"

U.S. patent application Ser. No. 10/099,629 in the name of Brett Galloway, Mark Hill, and Anne Cesa Klein, entitled "Method And System For Controlling Network Traffic Within The Same Connection With Different Packet Tags By Varying The Policies Applied To A Connection;"

U.S. patent application Ser. No. 10/155,936 now U.S. Pat. No. 6,591,299, in the name of Guy Riddle, Robert L. Packer, and Mark Hill, entitled "Method For Automatically Classifying Traffic With Enhanced Hierarchy In A Packet Communications Network;"

U.S. patent application Ser. No. 10/236,149, in the name of Brett Galloway and George Powers, entitled "Classification Data Structure enabling Multi-Dimensional Network Traffic Classification and Control Schemes;"

U.S. patent application Ser. No. 10/453,345, in the name of Scott Hankins, Michael R. Morford, and Michael J. Quinn, entitled "Flow-Based Packet Capture;"and U.S. patent application Ser. No. 10/611,573, in the name of Roopesh Varier, David Jacobson, and Guy Riddle, entitled "Network Traffic Synchronization Mechanism."

FIELD OF THE INVENTION

The present invention relates to network bandwidth management systems and, more particularly, to methods, apparatuses and systems directed to improving the efficiency of bandwidth allocation for short data flows in network environments including end systems employing slow-start mechanisms.

BACKGROUND OF THE INVENTION

Enterprises have become increasingly dependent on computer network infrastructures to provide services and accomplish mission-critical tasks. Indeed, the performance and efficiency of these network infrastructures have become critical as enterprises increase their reliance on distributed computing environments and wide area computer networks. The widely-used TCP/IP protocol suite, which implements the world-wide data communications network environment called the Internet and is employed in many local area networks, omits any explicit supervisory function over the rate of data transport over the various devices that comprise the network. While there are certain perceived advantages, this characteristic has the consequence of juxtaposing very high-speed packets and very low-speed packets in potential conflict and produces certain inefficiencies. Certain loading conditions degrade performance of networked applications and can even cause instabilities which could lead to overloads that could stop data transfer temporarily. The above-identified U.S. Patents and patent applications provide explanations of certain technical aspects of a packet based telecommunications network environment, such as Internet/Intranet technology based largely on the TCP/IP protocol suite, and describe the deployment of bandwidth management solutions to monitor and manage network environments using such protocols and technologies.

The Transmission Control Protocol (TCP) provides connection-oriented services for the protocol suite's application layer—that is, the client and the server must establish a connection to exchange data. TCP transmits data in segments encased in IP datagrams, along with checksums, used to detect data corruption, and sequence numbers to ensure an ordered byte stream. TCP is considered to be a reliable transport mechanism because it requires the receiving host to acknowledge not only the receipt of data but also its completeness and sequence. If the sending host does not receive notification from the receiving host within an expected time frame, the sending host times out and retransmits the segment.

TCP uses a sliding window flow-control mechanism to control the throughput over wide-area networks. As the receiving host acknowledges initial receipt of data, it advertises how much data it can handle, called its window size. The sending host can transmit multiple packets, up to the advertised window size, before it stops and waits for an acknowledgment. The sending host transmits data packets up to the advertised window size, waits for acknowledgement of the data packets, and transmits additional data packets.

TCP's congestion-avoidance mechanisms attempt to alleviate the problem of abundant packets filling up router queues. TCP's slow-start algorithm attempts to take full advantage of network capacity. TCP increases a connection's transmission rate using the slow-start algorithm until it senses a problem and then it backs off. It interprets dropped packets and/or timeouts as signs of congestion. The goal of TCP is for individual connections to burst on demand to use all available bandwidth, while at the same time reacting conservatively to inferred problems in order to alleviate congestion. Specifically, while TCP flow control is typically handled by the receiving host, the slow-start algorithm uses a congestion window, which is a flow-control mechanism managed by the sending host. With TCP slow-start, when a connection opens, only one packet is sent until an ACK is received. For each received ACK, the sending host doubles the transmission size, within bounds of the window size advertised by the receiving host. Note that this algorithm introduces an exponential growth rate. The TCP transmitter increases a connection's transmission rate using the slow-start algorithm until it senses a problem and then it backs off. It interprets dropped packets and/or timeouts as signs of congestion. Once TCP infers congestion, it decreases bandwidth allocation rates.

Given the congestion control mechanisms employed by TCP end systems, a crude form of bandwidth management in TCP/IP networks (that is, policies operable to allocate available bandwidth from a single logical link to network flows) is accomplished by a combination of TCP end systems and routers which queue packets and discard packets when some congestion threshold is exceeded. The discarded and therefore unacknowledged packet serves as a feedback mechanism to the TCP transmitter. Routers support various queuing options to provide for some level of bandwidth management. These options generally provide a rough ability to partition and prioritize separate classes of traffic. However, configuring these queuing options with any precision or without side effects is in fact very difficult, and in some cases, not possible. Seemingly simple things, such as the length of the queue, have a profound effect on traffic characteristics. Discarding packets as a feedback mechanism to TCP end systems may cause large, uneven delays perceptible to interactive users. Moreover, while routers can slow down inbound network traffic by dropping packets as a feedback mechanism to a TCP transmitter, this method often results in retransmission of data packets, wasting network traffic and, especially, inbound capacity of a WAN link. In addition, routers can only explicitly control outbound traffic and cannot prevent inbound traffic from over-utilizing a WAN link. A 5% load or less on outbound traffic can correspond to a 100% load on inbound traffic, due to the typical imbalance between an outbound stream of acknowledgments and an inbound stream of data.

In response, certain data flow rate control mechanisms have been developed to provide a means to control and optimize efficiency of data transfer as well as allocate available bandwidth among a variety of business enterprise functionalities. Such network devices, including PacketShaper® application traffic management appliance offered by Packeteer®, Inc. of Cupertino, Calif., are typically deployed at strategic points in enterprise networks to monitor and control data flows traversing, for example, a WAN link. For example, U.S. Pat. No. 6,038,216 discloses a method for explicit data rate control in a packet-based network environment without data rate supervision. Data rate control directly moderates the rate of data transmission from a sending host, resulting in just-in-time data transmission to control inbound traffic and reduce the inefficiencies associated with dropped packets. Bandwidth management devices allow for explicit data rate control for flows associated with a particular traffic classification. Bandwidth management devices allow network administrators to specify policies operative to control and/or prioritize the bandwidth allocated to individual data flows according to traffic classifications. In addition, certain bandwidth management devices, as well as certain routers, allow network administrators to divide available bandwidth into partitions. With some network devices, these partitions can be configured to ensure a minimum bandwidth and/or cap bandwidth as to a particular class of traffic. An administrator specifies a traffic class (such as FTP data, or data flows involving a specific user) and the size of the reserved virtual link— i.e., minimum guaranteed bandwidth and/or maximum bandwidth. Such partitions can be applied on a per-application basis (protecting and/or capping bandwidth for all traffic associated with an application) or a per-user basis (protecting and/or capping bandwidth for a particular user). In addition, certain bandwidth management devices allow administrators to define a partition hierarchy by configuring one or more partitions dividing the access link and further dividing the parent partitions into one or more child partitions.

The PacketShaper® application traffic management appliance, in certain of its implementations, uses policies and partitions to determine how to allocate bandwidth for individual data flows. When determining bandwidth allocation, the appliance takes into account all bandwidth demands and uses the following basic allocation scheme:

Traffic flows that have assigned guaranteed rates are satisfied first;

All other traffic—traffic with and without assigned policies and unclassified traffic—competes for the remaining bandwidth (called excess bandwidth);

Excess bandwidth is proportionately allocated based on the priorities in priority and rate policies;

Flows from traffic classes with partitions are given more bandwidth (or less) to satisfy those partitions' minimum (or maximum) rates. In certain application traffic management devices, an initial rate demand estimate is made for each rate-controlled flow based on the detected link capacity of the path between the client and server. U.S. Pat. No. 5,802,106 discloses methods and systems directed to estimating the effective rate capacity of the communications path between two TCP end systems. This initial rate demand estimate is used in bandwidth allocation determinations and becomes the target rate of the data flow subject to partition and policy limits. For example, when the appliance encounters a data flow, which matches a traffic class that includes a partition, it allocates bandwidth to that flow based on the number of current flows, and their respective target rates, subject to the partition. If the initial rate demand estimate does not exceed this allocation, it sets the target rate to the initial rate demand estimate.

In the case of short-lived flows (such as a data flow including a web page), however, the target rate may never be reached because of the TCP slow-start mechanisms discussed above. This circumstance results in certain inefficiencies resulting from unutilized bandwidth that goes un-used to satisfy other data flows. That is, the mechanisms for allocating bandwidth, by using this initial rate demand estimate, essentially over-allocate bandwidth to short-lived flows, as such flows terminate before the TCP slow-start mechanism allows them to ramp up to the estimated demand. These inefficiencies are exacerbated when the short-lived flows are also compressed (such as by a compression tunnel mechanism between the device allocating bandwidth and a second network device in the communications path), wherein the initial target rate is unachievable and the flow duration is too short for the unused bandwidth to be transferred to other data flows.

In light of the foregoing, a need in the art exists for methods, apparatuses and systems directed to bandwidth allocation mechanisms that adapt to TCP slow-start mechanisms. Embodiments of the present invention substantially fulfill this need.

SUMMARY OF THE INVENTION

The present invention provides methods, apparatuses and systems directed to improving the efficiency of bandwidth allocation schemes by adapting to slow-start mechanisms associated with network communications protocols, such as the TCP/IP protocol suite. In one implementation, the present invention scales down the initial target rate assigned to a data flow to a fraction of an initial estimate of the effective rate capacity of the communications path between two hosts. As packets are received, the target rate is gradually increased, eventually up to the detected rate capacity of the communications path. Implementations of the present invention improve the efficiency of bandwidth allocation by reducing the over-allocation of bandwidth to data flows during the slow-start phase, leaving more bandwidth available to other data flows.

DESCRIPTION OF PREFERRED EMBODIMENT(S)

Figure 1:
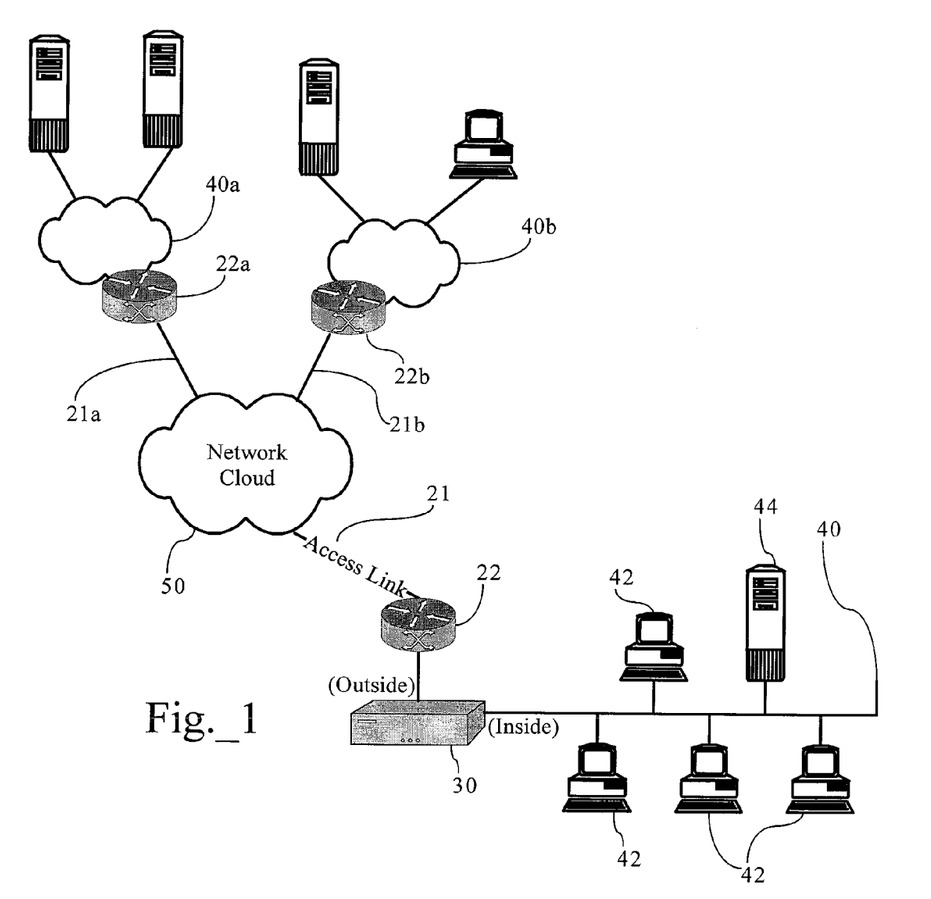
FIG. 1 is a schematic diagram illustrating a computer network including a traffic management device according to an implementation of the present invention.

FIG. 1 illustrates a network environment in which embodiments of the present invention may operate. As FIG. 1 shows, network 40 interconnects several TCP/IP end systems, including client devices 42 and server device 44, and provides access to resources operably connected to computer network 50 via router 22 and access link 21. Access link 21 is a physical and/or logical connection between two networks, such as computer network 50 and network 40. The computer network environment, including network 40 and computer network 50 is a packet-based communications environment, employing TCP/IP protocols, and/or other suitable protocols, and has a plurality of interconnected digital packet transmission stations or routing nodes. Network 40 can be a local area network, a wide area network, or any other suitable network. As FIG. 1 also illustrates, traffic management device 30, in one implementation, is deployed at the edge of network 40 to manage data flows traversing access link 21. As FIG. 1 illustrates network 50 interconnecting network 40, which may be a central operating or headquarters facility, and networks 40a, 40b, which may be networks supporting branch office facilities. Although not shown in FIG. 1, traffic management devices may be deployed at the edge of networks 40a, 40b, as well.

Figure 2:
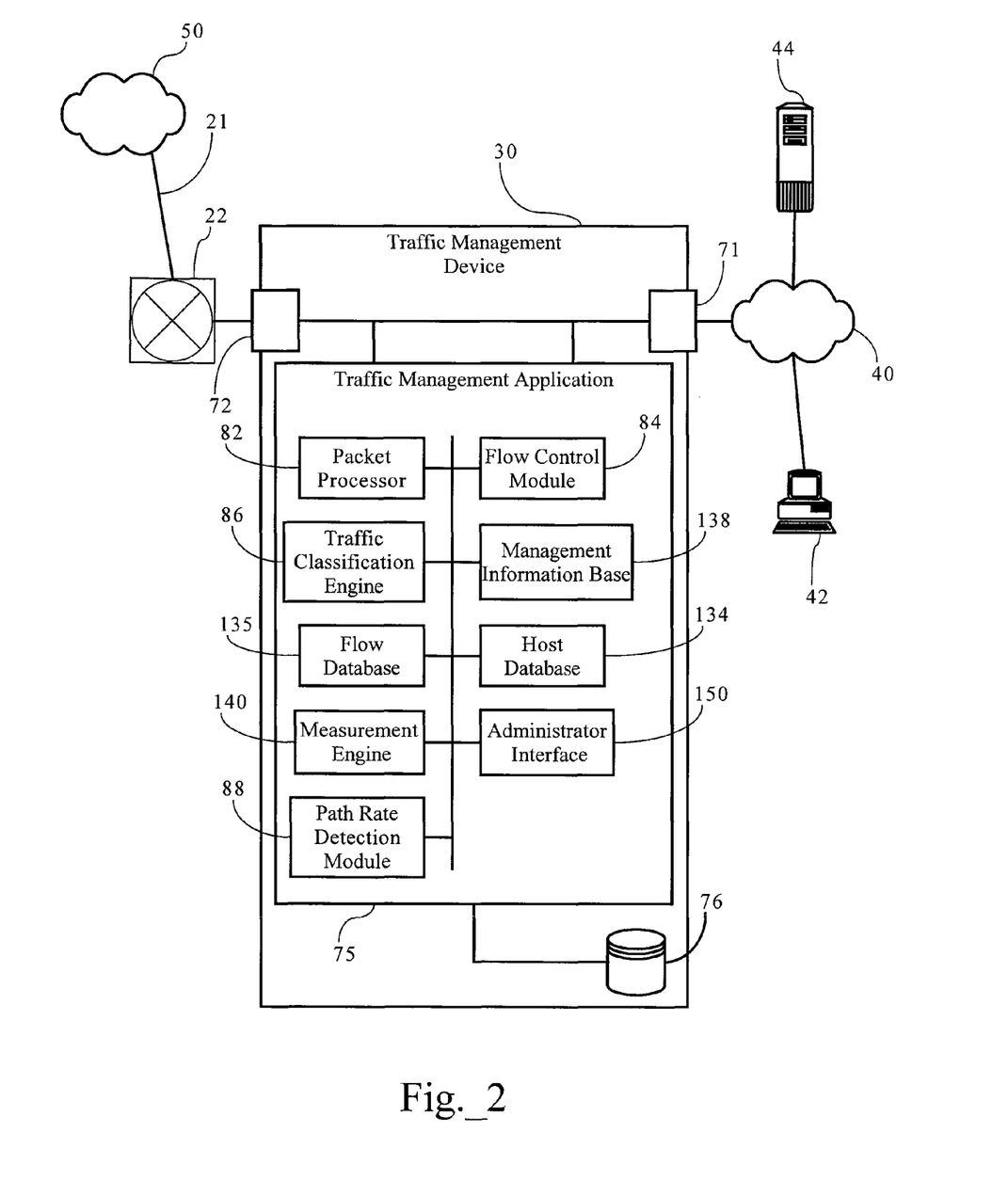
FIG. 2 is a functional block diagram illustrating the functionality of a traffic management device according to an implementation of the present invention.

As discussed more fully below, traffic management device 30, in one implementation, is operative to detect and classify data flows, and manage bandwidth utilization across access link 21. A variety of deployment configurations are possible. FIGS. 1 and 2 show deployment of traffic management device 30 deployed between router 22 and a first network 40 (comprising a hub, switch, router, and/or a variety of combinations of such devices implementing a LAN or WAN) interconnecting two end-systems (here, client computer 42 and server 44). Alternatively, in other implementations, traffic management device 30 may be disposed in the communication path between access link 21 and router 22. In other embodiments, multiple traffic management devices can be disposed at strategic points in a given network infrastructure to achieve various objectives. For example, the traffic monitoring functionality described herein may be deployed in multiple network devices and used in redundant network topologies by integrating the network traffic synchronization functionality described in U.S. application Ser. No. 10/611,573, incorporated by reference above. Still further, the present invention can be deployed in a network environment comprising a plurality of redundant access links, conceptually aggregated into a virtual access link for the purposes of billing and administration. Still further, traffic management devices 30 may operate substantially independently, or cooperate with traffic management devices deployed at the edge of networks 40a, 40b to provide an end-to-end system that manages bandwidth utilization. For example, assuming that access links 21, 21a are dedicated only to network traffic between networks 40, 40a, traffic management devices 30, 30a can be configured to control bandwidth utilization only as to outbound data flows.

A. Rate Control Mechanisms Adaptive to Slow-Start Mechanisms

As discussed above, traffic management device 30, in one implementation, is operative to classify data flows and, depending on the classification, enforce respective bandwidth utilization controls on the data flows to control bandwidth utilization of, and optimize network application performance across, access link 21. As FIG. 2 illustrates, traffic management device 30, in one implementation, comprises traffic management application 75, and first and second network interfaces 71, 72, which operably connect traffic management device 30 to the communications path between network 40 and router 22. Traffic management application 75 generally refers to the functionality implemented by traffic management device 30. In one embodiment, traffic management application 75 is a combination of hardware and software, such as a central processing unit, memory, a system bus, an operating system and one or more software modules implementing the functionality described herein.

In one embodiment, first and second network interfaces 71, 72 are implemented as a combination of hardware and software, such as network interface cards and associated software drivers. In addition, the first and second network interfaces 71, 72 can be wired network interfaces, such as Ethernet interfaces, and/or wireless network interfaces, such as 802.11, BlueTooth, satellite-based interfaces, and the like. As FIG. 1 illustrates, traffic management device 30, in one embodiment, includes persistent memory 76, such as a hard disk drive or other suitable memory device, such writable CD, DVD, or tape drives. Traffic management device 30 can include additional network interfaces to support additional access links or other functionality.

As FIG. 2 illustrates, traffic management application 75, in one implementation, includes a packet processor 82, flow control module 84, traffic classification engine 86, and path rate detection module 88. Traffic management application 75, in one implementation, further comprises host database 134, flow database 135, measurement engine 140, management information base 138, and administrator interface 150. In one embodiment, the packet processor 82 is operative to process data packets, such as storing packets in a buffer structure, detecting new data flows, and parsing the data packets for various attributes (such as source and destination addresses, and the like) and maintaining one or more measurement variables or statistics (such as packet count) in connection with the data flows. The traffic classification engine 86, as discussed more fully below, is operative to classify data flows based on one or more attributes associated with the data flows. Traffic classification engine 86, in one implementation, stores traffic classes associated with data flows encountered during operation of traffic management device 30, as well as manually created traffic classes configured by a network administrator, in a hierarchical traffic class structure. In one embodiment, traffic classification engine 86 stores traffic classes, in association with pointers to traffic management policies or pointers to data structures defining such traffic management policies. In one implementation, flow control module 84 is operative to apply bandwidth utilization controls to data flows traversing the access link 21 in the inbound and/or outbound directions.

Path rate detection module 88, in one implementation, is operative to compute, for each data flow, certain parameters that control operation of the slow-start adaptive mechanism according to the present invention. In one implementation, path rate detection module 88 computes the effective data rate (initial rate demand) of the communications path between two end systems. Path rate detection module 88, as discussed more fully below, also computes the estimated number of packets that a sending host will transmit before achieving the effective data rate of the communications path (threshold rate demand packet count).

As discussed above, in one implementation, traffic management application 75 further comprises measurement engine 140, management information base (MIB) 138, and administrator interface 150. Management information base 138 is a database of standard and extended network objects related to the operation of traffic management device 30. Measurement engine 140 maintains measurement data relating to operation of traffic management device 30 to allow for monitoring of bandwidth utilization and network performance across access link 21 with respect to a plurality of bandwidth utilization and other network statistics on an aggregate and/or per-traffic-class level.

Administrator interface 150 facilitates the configuration of traffic management device 30 to adjust or change operational and configuration parameters associated with the device. For example, administrator interface 150 allows administrators to select identified traffic classes and associate them with traffic management policies. Administrator interface 150 also displays various views associated with a hierarchical traffic classification scheme and allows administrators to configure or revise the hierarchical traffic classification scheme. Administrator interface 150 can provide a command line interface or a graphical user interface accessible, for example, through a conventional browser on client device 42.

A.1. Packet Processing

As discussed above, packet processor 82, in one implementation, is operative to detect new data flows, instantiate data structures associated with the flows and parse packets to populate one or more fields in the data structures. In one embodiment, when packet processor 82 encounters a new data flow it stores the source and destination IP addresses contained in the packet headers in host database 134. Packet processor 82 further constructs a control block (flow) object including attributes characterizing a specific flow between two end systems. In one embodiment, packet processor 82 writes data flow attributes having variably-sized strings (e.g., URLs, host names, etc.) to a dynamic memory pool. The flow specification object attributes contain attribute identifiers having fixed sizes (e.g., IP addresses, port numbers, service IDs, protocol IDs, etc.), as well as the pointers to the corresponding attributes stored in the dynamic memory pool. Other flow attributes may include application specific attributes gleaned from layers above the TCP layer, such as codec identifiers for Voice over IP calls, Citrix database identifiers, and the like. Packet processor 82, in one embodiment, reserves memory space in the dynamic memory pool for storing such variably-sized attribute information as flows traverse traffic management device 30. Packet processor 82 also stores received packets in a buffer structure for processing. In one embodiment, the packets are stored in the buffer structure with a wrapper including various information fields, such as the time the packet was received, the packet flow direction (inbound or outbound), and a pointer to the control block object corresponding to the flow of which the packet is a part.

In one embodiment, a control block object contains a flow specification object including such attributes as pointers to the "inside" and "outside" IP addresses in host database 134, as well as other flow specification parameters, such as inside and outside port numbers, service type (see below), protocol type and other parameters characterizing the data flow. In one embodiment, such parameters can include information gleaned from examination of data within layers 2 through 7 of the OSI reference model. U.S. Pat. Nos. 6,046,980 and 6,591,299, as well as others incorporated by reference herein, disclose classification of data flows for use in a packet-based communications environment. FIG. 1 illustrates the concept associated with inside and outside addresses. As discussed above, in one embodiment, a flow specification object includes an "inside" and "outside" address relative to traffic management device 30. See FIG. 1. For a TCP/IP packet, packet processor 82 can compute the inside and outside addresses based on the source and destination network addresses of the packet and the direction of the packet flow.

In one embodiment, packet processor 82 creates and stores control block objects corresponding to data flows in flow database 135. In one embodiment, control block object attributes include a pointer to a corresponding flow specification object, as well as other flow state parameters, such as TCP connection status, timing of last packets in the inbound and outbound directions, speed information, apparent round trip time, packet count, etc. Control block object attributes further include at least one traffic class identifier (or pointer(s) thereto) associated with the data flow, as well as policy parameters (or pointers thereto) corresponding to the identified traffic class. In one embodiment, control block objects further include a list of traffic classes for which measurement data (maintained by measurement engine 140) associated with the data flow should be logged. In one embodiment, to facilitate association of an existing control block object to subsequent packets associated with a data flow or connection, flow database 135 further maintains a control block hash table including a key comprising a hashed value computed from a string comprising the inside IP address, outside IP address, inside port number, outside port number, and protocol type (e.g., TCP, UDP, etc.) associated with a pointer to the corresponding control block object. According to this embodiment, to identify whether a control block object exists for a given data flow, packet processor 82 hashes the values identified above and scans the hash table for a matching entry. If one exists, packet processor 82 associates the pointer to the corresponding control block object with the data flow.

To allow for identification of service types (e.g., FTP, HTTP, etc.), packet processor 82, in one embodiment, is supported by one to a plurality of service identification tables in a relational database that allow for identification of a particular service type (e.g., application, protocol, etc.) based on the attributes of a particular data flow. Of course, other suitable data structures can be used to support the identification of service types, such as a set of hard-coded instructions, an XML file, and the like. In one embodiment, a services table including the following fields: 1) service ID, 2) service aggregate(if any), 3) name of service, 4) service attributes (e.g., port number, outside IP address, etc.), and 5) default bandwidth management policy. A service aggregate encompasses a combination of individual services (each including different matching criteria, such as different port numbers, etc.) corresponding to the service aggregate. When traffic management device 30 encounters a new flow, packet processor 82 analyzes the data flow against the service attributes in the services table to identify a service ID corresponding to the flow. In one embodiment, packet processor 82 may identify more than one service ID associated with the flow. In this instance, packet processor 82 associates the more/most specific service ID to the flow. For example, network traffic associated with a peer-to-peer file sharing service may be identified as TCP or HTTP traffic, as well as higher level traffic types such as the actual file sharing application itself (e.g., Napster, Morpheus, etc.). In this instance, packet processor 82 associates the flow with the most specific service ID. A traffic class maintained by traffic classification engine 86 may be configured to include matching rules based on the service IDs in the services table. For example, a matching rule directed to HTTP traffic may simply refer to the corresponding service ID, as opposed to the individual attributes that packet processor 82 uses to initially identify the service.

In one embodiment, when packet processor 82 inspects a flow it may detect information relating to a second, subsequent flow (e.g., an initial FTP command connection being the harbinger of a subsequent data connection, etc.). Packet processor 82, in response to such flows populates a remembrance table with attributes gleaned from the first flow, such as IP addresses of the connection end points, port numbers, and the like. Packet processor 82 scans attributes of subsequent flows against the remembrance table to potentially associate the subsequent flow with the first flow and to assist in identification of the second flow.

Packet processor 82, in one implementation, performs operations that support the rate control mechanisms that adapt to connection protocols (e.g., TCP) that include slow-start procedures. In one embodiment, control block objects also include fields reserved for the initial rate demand and the threshold rate demand packet count computed by path rate detection module 88. In one implementation, each control block object also includes a field reserved for the target rate allocated to each corresponding flow. As described more fully below, packet processor 82 sets the target rate based on the initial rate demand, the threshold rate demand packet count, and the current packet count associated with the flow. Initially, packet processor 82 sets the target rate to a fraction of the initial rate demand and increases the target rate as the packet count increases and crosses various threshold values. Flow control module 84 uses the target rate information in the control block object in allocating bandwidth to individual flows.

A.2. Traffic Classification

A traffic class comprises a set of matching rules or attributes allowing for logical grouping of data flows that share the same characteristic or set of characteristics—e.g., a service ID or type (see Section A.1., above), a specific application, protocol, IP address, MAC address, port, subnet, etc. In one embodiment, each traffic class has at least one attribute defining the criterion(ia) used for identifying a specific traffic class. For example, a traffic class can be defined by configuring an attribute defining a particular IP address or subnet. Of course, a particular traffic class can be defined in relation to a plurality of related and/or orthogonal data flow attributes. U.S. Pat. Nos. 6,412,000 and 6,591,299, and 7,032,072 describe some of the data flow attributes that may be used to define a traffic class, as well as the use of hierarchical classification structures to associate traffic classes to data flows. In one embodiment, traffic management device 30 includes functionality allowing for classification of network traffic based on information from layers 2 to 7 of the OSI reference model. Traffic management device 30 can be configured to include matching rules that define a plurality of network applications commonly found in enterprise networks, such as database applications, Citrix® flows, ERP applications, and the like.

In one embodiment, traffic management device 30 is configured to include a predefined set of traffic classes based upon a knowledge base gleaned from observation of common or known traffic types on current networks. Traffic management device 30, in one embodiment, also allows an administrator to manually create a traffic class by specifying a set of matching attributes. As discussed above, administrator interface 150, in one embodiment, allows for selection of a traffic class and the configuration of traffic management policies for the selected traffic class. Administrator interface 150, in one embodiment, also allows for the selection and arrangement of traffic classes into hierarchical reference trees. In one embodiment, traffic classification engine 86 also stores traffic classes added by the traffic discovery module. Furthermore, as discussed below, traffic management device 30 may also include traffic class discovery functionality that automatically adds traffic classes to traffic classification engine 86 in response to data flows traversing the device.

Traffic classification engine 86, in one implementation, stores traffic classes associated with data flows that traverse access link 21. Traffic classification engine 86, in one embodiment, stores the traffic classes and corresponding data (e.g., matching rules, policies, partition pointers, etc.) related to each traffic class in a hierarchical tree. This tree is organized to show parent-child relationships—that is, a particular traffic class may have one or more subordinate child traffic classes with more specific characteristics (matching rules) than the parent class. For example, at one level a traffic class may be configured to define a particular user group or subnet, while additional child traffic classes can be configured to identify specific application traffic associated with the user group or subnet.

In one embodiment, the root traffic classifications are "/Inbound" and "/Outbound" data flows. Any data flow not explicitly classified is classified as "/Inbound/Default" or "/Outbound/Default". The "LocalHost" traffic class corresponds to data flows destined for traffic management device 30, such as requests for stored measurement data or device configuration changes. In one embodiment, traffic classification engine 86 attempts to match to a leaf traffic class node before proceeding to remaining traffic class nodes in the hierarchical configuration. If a traffic class is found, the traffic classification engine 86 stops the instant search process and returns the identified traffic classification. Of course, one skilled in the art will recognize that alternative ways for traversing the hierarchical traffic class configuration can be implemented. For example, traffic classification engine 86 may be configured to traverse all traffic class nodes at a given level before proceeding to lower levels of the traffic classification tree. If more than one traffic class matches the data flow, traffic classification engine 86 can be configured with rules or other logic to select from one of the matching traffic classes.

In one embodiment, administrator interface 150 displays the traffic class tree and allows for selection of a traffic class and the configuration of bandwidth utilization controls for that traffic class, such as a partition, a policy, or a combination thereof. Administrator interface 150 also allows for the arrangement of traffic classes into a hierarchical classification tree. Traffic management device 30 further allows an administrator to manually create a traffic class by specifying a set of matching rules and, as discussed below, also automatically creates traffic classes by monitoring network traffic across access link 21 and classifying data flows according to a set of criteria to create matching rules for each traffic type. In one embodiment, each traffic class node includes a traffic class identifier; at least one traffic class (matching) attribute; at least one policy parameter (e.g., a bandwidth utilization control parameter, a security policy parameter, etc.), a pointer field reserved for pointers to one to a plurality of child traffic classes. In one embodiment, traffic classification engine 86 implements a reference tree classification model wherein separate traffic classification trees can be embedded in traffic class nodes of a given traffic classification tree. U.S. application Ser. No. 10/236,149, incorporated by reference herein, discloses the use and implementation of embeddable reference trees.

A.2.a. Automatic Traffic Classification

In one implementation, a traffic discovery module (not shown) analyzes data flows for which no matching traffic class was found in traffic classification engine 86. The traffic discovery module, in one embodiment, is operative to apply predefined sets of matching rules to identify a traffic class corresponding to non-matching data flows. In one implementation, traffic discovery module operates on data flows classified as either Inbound/Default or Outbound/Default. In one embodiment, the traffic discovery module is configured to include a predefined set of traffic classes based upon a knowledge base gleaned from observation of common or known traffic types on current networks. In one embodiment, the traffic discovery module creates traffic classes automatically in response to data flows traversing traffic management device 30 and stores such traffic classes in traffic classification engine 86. Automatic traffic classification is disclosed in U.S. Pat. Nos. 6,412,000, 6,457,051, and 6,591,299, which are incorporated herein by reference.

As discussed above, the traffic discovery module applies one or more traffic discovery thresholds when deciding whether to present or add newly discovered traffic classes. In one embodiment, the traffic discovery module must detect a minimum number of data flows within a predefined period for a given traffic type before it creates a traffic class in traffic classification engine 86. In one embodiment, auto-discovered traffic classes are automatically assigned predefined traffic management policies. U.S. patent application Ser. No. 09/198,051, incorporated by reference herein, discloses automatic assignment of traffic policies for discovered traffic classes.

A.3. Path Rate Detection Module

Path rate detection module 88, as discussed above, is operative to compute, for each data flow, certain parameters that control operation of the slow-start adaptive mechanism according to the present invention. In one implementation, path rate detection module 88 computes the effective data rate (initial rate demand) of the communications path between two end systems. Path rate detection module 88, as discussed more fully below, also computes the estimated number of packets that a sending host will transmit before achieving the effective data rate of the communications path (threshold rate demand packet count).

A.3.a. Observing Client-Server Transactions

Figure 3:
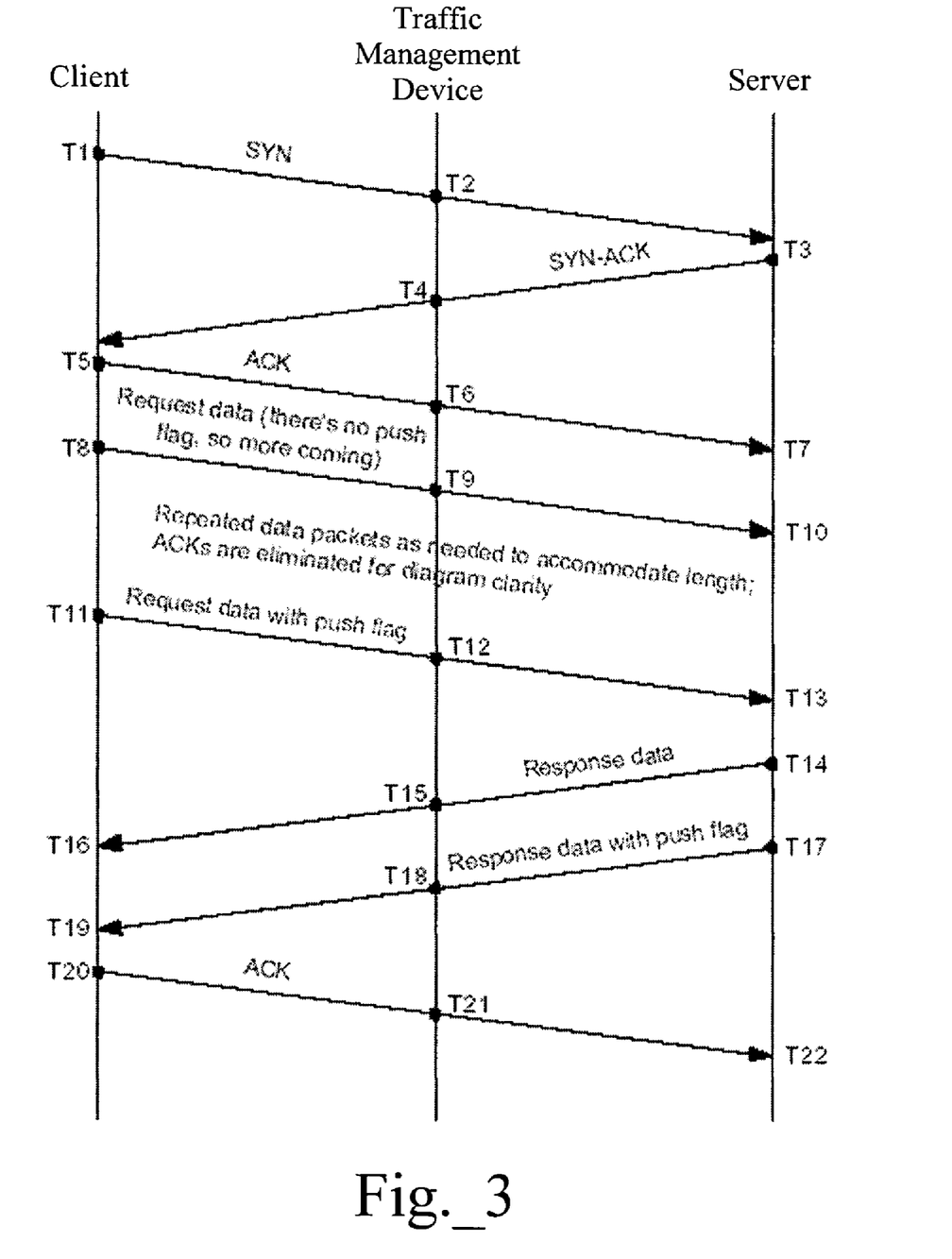
FIG. 3 is a TCP diagram illustrating the timing of events associated with estimating initial rate demands for TCP flows, as well as computing round trip times.

To compute the parameters discussed above, path rate detection module 88 tracks the course of a client-server transaction, making various packet arrival time and size observations, and uses information about a TCP connection to differentiate one portion of the exchange from another. FIG. 3 illustrates the typical components associated with a TCP connection. FIG. 3 is a standard TCP diagram showing the course of a network transaction over time. Arrows indicate packets traveling the network between client and server. Time increases as one descends the diagram, with successive event times noted as TN (T1 representing the first event and T22, the last).

As FIG. 3 illustrates, a client initiates a server connection with a SYN at time T1. Path rate detection module 88 notes the SYN at time T2 and forwards it along to the server. The server responds with a SYN-ACK at time T3. Path rate detection module 88 notes the SYN-ACK at time T4, passing it along as shown. TCP stacks implemented at the end systems usually respond with a SYN-ACK very rapidly, within the kernel and with no context switches. The SYN-ACK follows the SYN almost immediately. Therefore, time T4 minus time T2 results in an accurate measure of the round-trip network delay between traffic management device 30 and the server. Observation at traffic management device 30 of these packet arrival times associated with this interchange yields measurements useful to certain implementations of the invention—i.e., the server transit delay (STD): STD=T4 −T2.

As FIG. 3 illustrates, the client receives the SYN-ACK and issues the final ACK of the three-way handshake at time T5. Path rate detection module 88 notes the ACK at time T6, passing it along to the server. In one implementation, it is reasonably assumed that no processing transpires between the client's receipt of the SYN-ACK and its own corresponding ACK at time T5. Time T6 minus time T4 yields an accurate measure of the round-trip network delay between the client and traffic management device 30. The client transit delay (CTD):

$$CTD = T6 - T4$$

Putting together the server transit delay (STD) and the client transit delay (CTD) yields the total end-to-end round trip time between the client and the server.

$$RTT \text{ (Round-Trip Time)} = STD + CTD$$

In addition, as discussed more fully below, the packet arrival times corresponding to a given TCP transactions can also be used to compute an initial rate demand.

A.3.b. Initial Rate Demand

As discussed above, the initial rate demand, in one implementation, is the effective rate capacity of the communications path between the end systems corresponding to a given data flow. Referring to the TCP diagram of FIG. 3, the initial rate demand can be computed in a number of different ways. In one implementation, path rate detection module computes the initial rate demand based on the size, and round trip time, of the initial handshake packets (SYN, SYN-ACK and ACK) between traffic management device 30 and either the server or the client (depending on the direction of the flow). In one implementation, path rate detection module 88 adds the packet size of the handshake packets, as discussed in more detail below, and divides this sum by the time interval between arrival of the corresponding handshake packets. For example, to compute the effective data rate for packets transmitted from the client to the server, path rate detection module 88 adds the number of bytes in the SYN and SYN-ACK packets and divides this sum by the server transit delay (T4–T2). To compute the effective data rate for packets transmitted from the server to the client, path rate detection module 88 divides the aggregate number of bytes in the SYN-ACK and ACK packets by the client transit delay (T6–T4).

The demand rate estimation methodology discussed above is based on a model of the network as a collection of interconnected routing nodes that queue packets based on some fair share, best efforts, or priority/demand scheme, and further assumes that: 1) the time interval between receipt of the SYN packet and T3 is negligible; 2) the time interval between receipt of SYN-ACK and T5 is also negligible; 3) the size of the handshake packets (SYN, SYN-ACK and ACK) are small and substantially the same; and 4) the packet serialization time (at the traffic management device 30) is insignificant relative to the time it takes for a packet to propagate through the network.

Path rate detection module 88, however, may compute the initial rate demand in other ways. For example, path rate detection module 88 may compute the estimate rate demand by analyzing the size of the first data packet and dividing it by the time interval between receipt of the first data packet (T9) and receipt of the ACK packet (T6). U.S. Pat. Nos. 5,802,106 and 6,205,120 disclose methods for rapidly determining effective data rates between end systems in a packet-based communications network. These patents also disclose methods for computing effective data rates when the initial data in the flow is appended to the ACK packet.

Figure 5A:
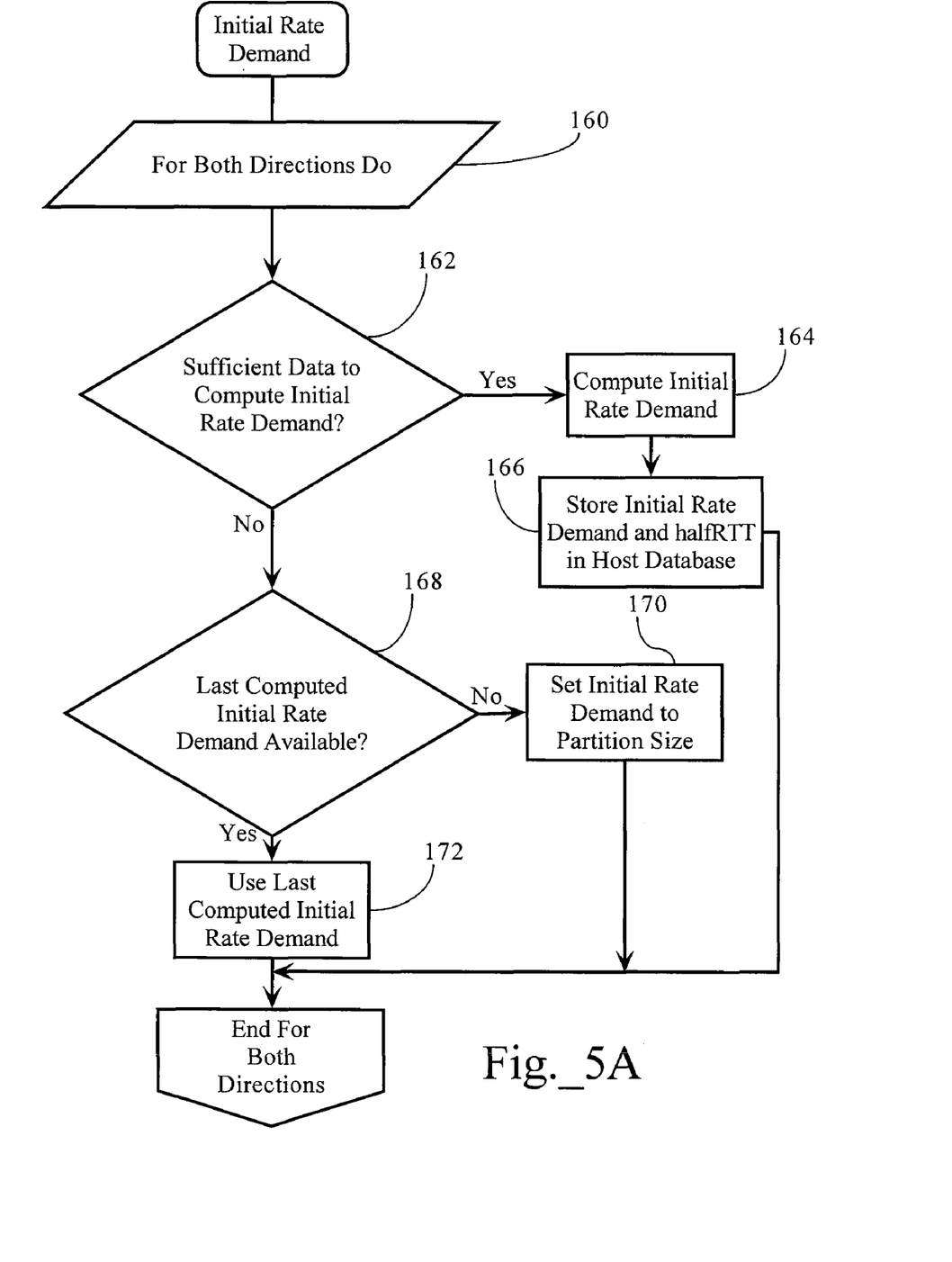
FIG. 5A is a flow chart diagram illustrating a method, according to an embodiment of the present invention, directed to computing an initial rate demand estimate for a data flow.

FIG. 5A illustrates the process flow, according to one implementation of the present invention, directed to computed the initial rate demand. As FIG. 5A illustrates, path rate detection module 88 includes logic that adjusts to circumstances where there is insufficient information to compute the initial rate demand, such as where the connection handshake packets do not arrive or are not detected. Specifically, when a new data flow is detected, path rate detection module 88 attempts to compute new initial rate demands, as discussed above, for both the client-to-server and server-to-client directions (160). In one implementation, path rate detection module 88 first determines whether there is sufficient data to compute the initial rate demand (162). In the client-to-server direction, path rate detection module 88 determines whether the packet arrival times T2 and T4 have been detected. In the server-to-client direction, path rate detection module 88 determines whether the packet arrival times T4 and T6 have been detected. If the packet arrival times are available, path rate detection module 88 computes the initial rate demand as discussed above (164). In one implementation, path rate detection module 88 stores the initial rate demand in host database 134, and the applicable round trip time for the half connection (halfRTT) in association with the IP address corresponding to the client or server (166), overwriting any previously stored value. Specifically, path rate detection module 88 stores the client-to-server initial rate demand in association with the IP address of the client end system, and the server-to-client initial rate demand in association with the IP address of the server end system. In addition, in the client-to-server direction, the halfRTT value is the server transit delay (STD), discussed above. In the server-to-client direction, the halfRTT value is the client transmit delay (CTD) discussed above. As FIG. 5A illustrates, if there is insufficient data to compute the initial rate demand, path rate detection module 88 may subsequently use one or both of these initial rate demands (172), assuming such values have been previously computed and stored (168). If no previously computed rate is available, path rate detection module 88 sets the initial rate demand to the partition size applicable to the data flow (170), essentially leaving it to flow control module 84 to determine an appropriate bandwidth allocation for the data flow. For example, if the a partition having a bandwidth limit has been configured for the traffic class to which the data flow corresponds, the initial rate demand is set to the specified bandwidth limit.

A.3.c. Threshold Rate Demand Packet Count

As discussed above, the threshold rate demand packet count is an estimate of the number of packets encountered in either the server-to-client or client-to-server direction before the initial rate demand is achieved. In one implementation, the threshold rate demand packet count is derived by taking the product of the initial rate demand and the observed, end-to-end round trip time associated with a given data flow, and dividing by a default or average packet size. Round trip time (RTT) is the time (in milliseconds) spent in transit when a client and server exchange a small packet, such as an ACK, SYN-ACK, or ACK packet (see below). The default or average packet size is a heuristically determined value based on the observed average packet size. The default average packet size can be a statically configured parameter based on heuristic evaluations of networks generally. In one implementation, the average packet size is set to 1000 bytes. In other implementations, the default average packet size can be dynamically adjusted based on average packet size determinations computed at periodic intervals by traffic management device 30. Still further, in some implementations, different average packet size values can be used for the client-to-server and server-to-client directions. In other implementations, the threshold rate demand packet count can be replaced by a threshold rate demand byte count which is an estimate of the number of bytes a sending host will transmit before the initial rate demand is achieved. In such an implementation, the path rate detection module 88 monitors the byte count corresponding to the data flows to determine when to increase the target rates for the data flows.

Figure 5B:
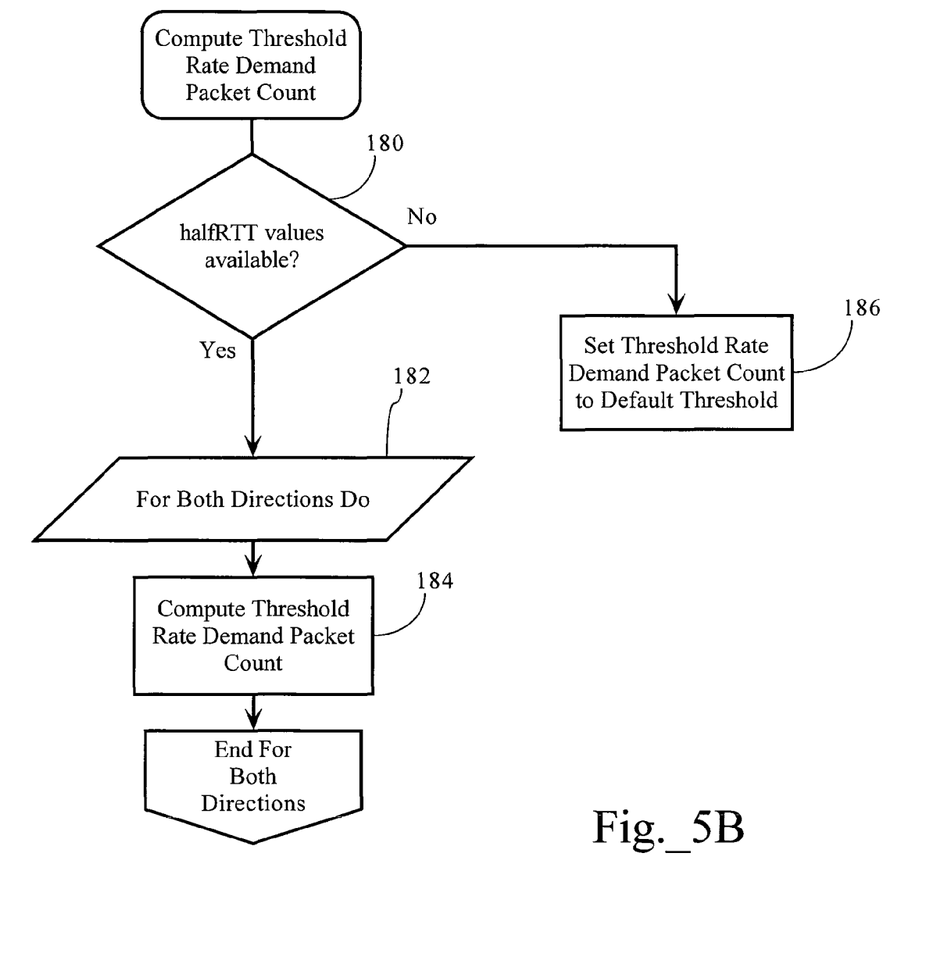
FIG. 5B is a flow chart diagram providing a method, according to an embodiment of the present invention, directed to computing a threshold demand rate packet count.

FIG. 5B illustrates the process flow, according to one implementation, associated with computing the threshold rate demand packet count. As FIG. 5B shows, path rate detection module 88, in one implementation, first scans host database 134 to determine whether halfRTT values are stored in association with the IP addresses of the hosts corresponding to the data flow (180). One or both of the halfRTT values may be newly computed or previously computed values depending on the considerations discussed directly above. If the halfRTT values are available, path rate detection module 88 computes the threshold rate demand packet count (184). As discussed above, path rate detection module 88, for both the client-to-server and server to client directions (182) adds the halfRTT values to compute the end-to-end round trip time (RTT), multiplies the RTT by the initial rate demand computed above, and divides by the average packet size.

As FIG. 5B provides, if one or both of the halfRTT values are not available to compute RTT, path rate detection module 88, in one implementation, sets the threshold rate demand packet count to a default threshold value. The default threshold value, in one implementation, is set to six packets. Of course, other values can be used based on a heuristic evaluation of the behavior of TCP connections.

A.4. Flow Control Module

As discussed above, flow control module 84 applies bandwidth utilization controls (and, in some embodiments, other policies) to data flows traversing access link 21. Traffic management device 30, however, can also be configured to implement a variety of different policy types, such as security policies, admission control policies, marking (diffserv, VLAN, etc.) policies, redirection policies, caching policies, transcoding policies, and network address translation (NAT) policies. Of course, one of ordinary skill in the art will recognize that other policy types can be incorporated into embodiments of the present invention. The functionality of flow control module 84, in one implementation, can be conceptually segregated into three main tasks: 1) allocation of bandwidth to individual flows, 2) enforcement of bandwidth allocations, and 3) monitoring of actual bandwidth utilization to provide feedback to subsequent bandwidth allocations.

Allocation of bandwidth is primarily influenced by three main factors: 1) the number of concurrent flows and their respective traffic classifications; 2) the overall or aggregate bandwidth utilization control scheme configured by the network administrator, and 3) the respective target rates corresponding to the individual flows. As discussed above, a user can select a given traffic class and specify one or more bandwidth utilization controls for the traffic class. A bandwidth utilization control for a particular traffic class can comprise an aggregate bandwidth utilization control, a per-flow bandwidth utilization control, or a combination of the two (see Sections A.4.a. & A.4.b.). The combination of bandwidth utilization controls across the traffic classes defines an aggregate bandwidth utilization control scheme. Flow control module 84, in one implementation, computes bandwidth allocations for individual flows on a periodic basis (e.g., 100-150 milliseconds). In another implementation, flow control module 84 can recompute bandwidth allocations on demand as required by the arrival of new data flows.

Flow control module 132 can use any suitable functionality to enforce bandwidth allocations known in the art, including, but not limited to class-based queuing, weighted fair queuing, class-based weighted fair queuing, Committed Access Rate (CAR) and "leaky bucket" techniques. Flow control module 132, in one implementation, may incorporate any or a subset of the TCP rate control functionality described in the cross-referenced U.S. patents and/or patent applications set forth above for controlling the rate of data flows.

A.4.a. Aggregate Bandwidth Utilization Controls

An aggregate bandwidth utilization control operates to manage bandwidth for aggregate data flows associated with a traffic class. An aggregate bandwidth utilization control can be configured to essentially partition the available bandwidth corresponding to a given access link. For example, a partition can be configured to protect a network traffic class by guaranteeing a defined amount of bandwidth and/or limit a network traffic class by placing a cap on the amount of bandwidth a traffic class can consume. Such partitions can be fixed or "burstable." A fixed partition allows a traffic class to use in the aggregate a defined amount of bandwidth. A fixed partition not only ensures that a specific amount of bandwidth will be available, but it also limits data flows associated with that traffic class to that same level. A burstable partition allows an aggregate traffic class to use a defined amount of bandwidth, and also allows that traffic class to access additional unused bandwidth, if needed. A cap may be placed on a burstable partition, allowing the traffic class to access up to a maximum amount of bandwidth, or the burstable partition may be allowed to potentially consume all available bandwidth across the access link. Partitions can be arranged in a hierarchy—that is, partitions can contain partitions. For example, the bandwidth, or a portion of the bandwidth, available under a parent partition can be allocated among multiple child partitions. In one embodiment, at the highest level, a partition exists for all available outbound bandwidth, while another partition exists for all available inbound bandwidth across the particular access link. These partitions are then sub-dividable to form a hierarchical tree. For example, an enterprise employing static partitions may define a static partition for a PeopleSoft software application traffic class, and sub-divide this parent partition into a large burstable child partition for its human resources department and a smaller burstable child partition for the accounting department.

In one embodiment, a partition is created by selecting a traffic class and configuring a partition for it. As discussed above, configurable partition parameters include 1) minimum partition size (in bits per second); 2) whether it is burstable (that is, when this option is selected, it allows the partition to use available excess bandwidth; when the option is not selected the partition has a fixed size); and 3) maximum bandwidth to be used when the partition bursts.

Traffic management device 30, in one embodiment, maintains certain parameter values relating to the outbound (available_outbound_capacity) and inbound capacity (available_inbound_capacity) of access link 21, as well as virtual bandwidth limits (configured_outbound_limit & configured inbound_limit) configured by a user. The outbound and inbound capacity parameters indicate the absolute capacity of the access link (such as 45 Mbps). The virtual bandwidth limits are bandwidth caps (specified by a user) enforced by flow control module 84 to limit bandwidth utilization to a desired level. In one implementation, traffic management device 30 maintains "Access Set" variables, outbound_access_bps and inbound_access_bps, which define the Outbound and Inbound Partition sizes actually used in connection with computing rate control and other bandwidth management parameters by flow control module 84. For example, if a child traffic class of the root/Inbound traffic class is configured with a partition that is allowed to burst, in one implementation, it may burst up to the current bandwidth cap associated with the root/Inbound partition. The Access Set variables are initially derived from the bandwidth limits (configured_outbound_limit & configured_inbound_limit) configured by a network administrator or other user.

A.4.b. Per-Flow Bandwidth Utilization Controls

Flow control module 84 is also operative to enforce per-flow bandwidth utilization controls on traffic across access link 21. Whereas aggregate bandwidth utilization controls (e.g., partitions, above) allow for control of aggregate data flows associated with a traffic class, per-flow bandwidth utilization controls allow for control of individual data flows. In one embodiment, flow control module 84 supports different bandwidth utilization control types, including, but not limited to, priority policies, rate policies, and discard policies. A priority policy determines how individual data flows associated with a traffic class are treated relative to data flows associated with other traffic classes. A rate policy controls the rate of data flows, for example, to smooth bursty traffic, such as HTTP traffic, in order to prevent a TCP end system from sending data packets at rates higher than access link 21 allows, thereby reducing queuing in router buffers and improving overall efficiency. U.S. patent application Ser. No. 08/742,994 now U.S. Pat. No. 6,038,216, incorporated by reference above, discloses methods and systems allowing for explicit data rate control in a packet-based network environment to improve the efficiency of data transfers. Similarly, U.S. Pat. No. 6,018,516, incorporated by reference above, methods and systems directed to minimizing unneeded retransmission of packets in a packet-based network environment. A rate policy can be configured to establish a minimum rate for each flow, allow for prioritized access to excess available bandwidth, and/or set limits on total bandwidth that the flow can consume. A discard policy causes flow control module 84 to discard or drop data packets or flows associated with a particular traffic class. Other policy types include redirection policies where an inbound request designating a particular resource, for example, is redirected to another server.

A.4.c. Allocation of Bandwidth to Data Flows

Flow control module 84, in one implementation, uses policies and partitions, as well as the target rates, to determine how to allocate bandwidth for individual data flows. More specifically, as discussed below, flow control module 84 allocates bandwidth to individual data flows based on 1) the combination of bandwidth utilization controls configured by the user, 2) the flows, and their respective bandwidth utilization controls, concurrently traversing traffic management device 30, 3) the target rates associated with the flows. When determining bandwidth allocation, flow control module 84 takes into account all bandwidth demands and uses the following basic allocation scheme:

Traffic flows that have assigned guaranteed rates are satisfied first;

All other traffic—traffic with and without assigned policies and unclassified traffic—competes for the remaining bandwidth (called excess bandwidth);

Excess bandwidth is proportionately allocated based on the priorities in priority and rate policies;

Flows corresponding to traffic classes with partitions are given more bandwidth (or less) to satisfy those partitions' minimum (or maximum) rates. Subject to this allocation scheme and partition and rate policy limits, flow control module 84 attempts to allocate bandwidth to individual flows up to the target rate corresponding to the flow, as specified in the control block object. Where such an allocation can not be achieved, however, another bandwidth allocation is used. For example, for all data flows corresponding to a given partition, flow control module 84 allocates bandwidth to a given data flow based on the lower of the target rate, or the rate that would be otherwise allocated to the data flow according to a fair-share, or weighted fair share algorithm.

A.5. Operation

Figure 4:
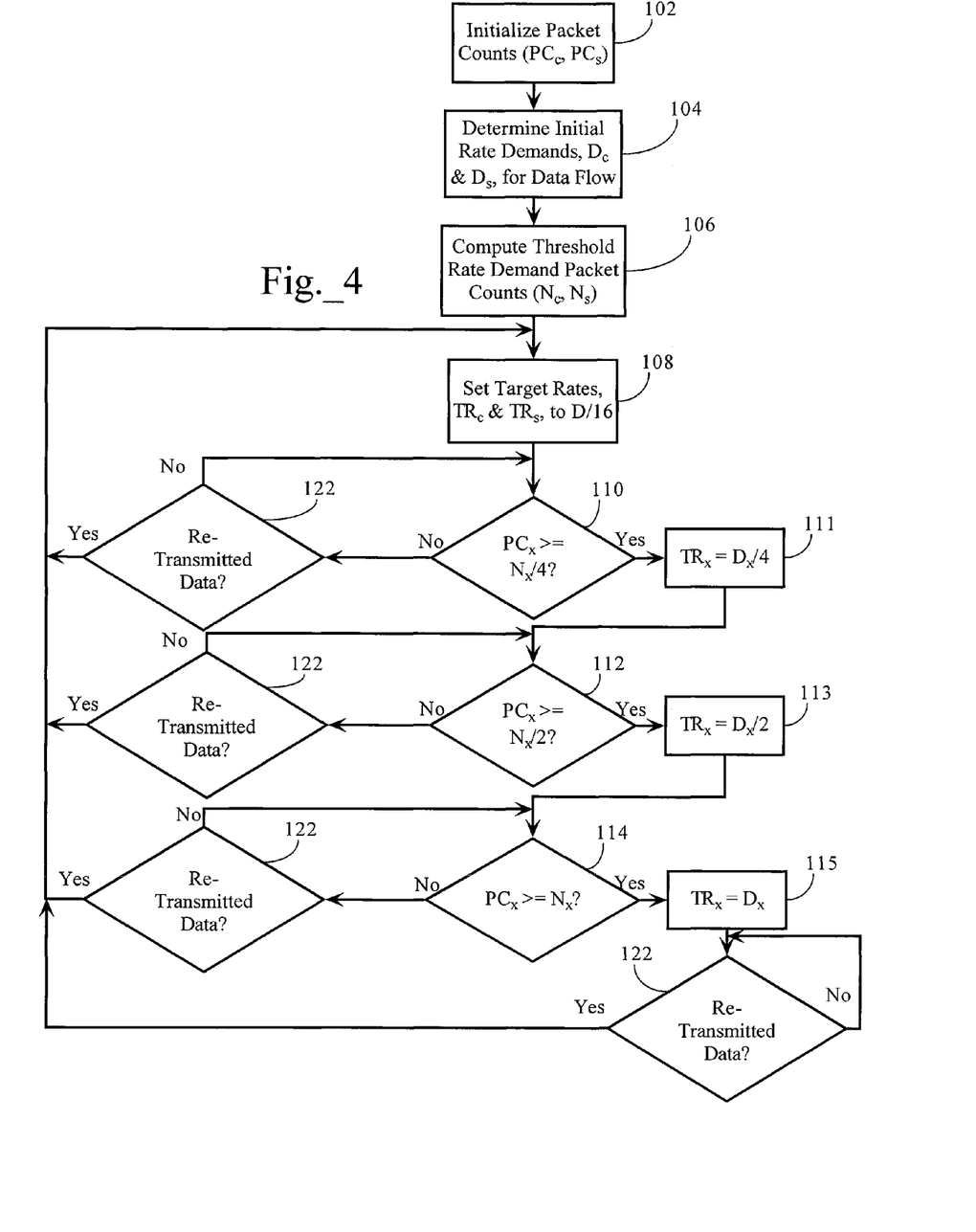
FIG. 4 is a flow chart diagram providing a method, according to an embodiment of the present invention, directed to computing an initial target rate for a data flow.

FIG. 4 illustrates the overall process flow associated with the slow-start adaptive mechanisms according to one implementation of the present invention. When a new data flow of the type associated with a slow start dynamic (e.g., TCP) is detected, packet processor 82 initializes the packet counts (PC) maintained in the control block object corresponding to the new data flow for both the client-to-server ($PC_c$), and server-to-client ($PC_s$) directions (102). Path rate detection module 88, as discussed above, computes an initial rate demand for the client-to-server ($D_c$), and server-to-client ($D_s$) directions (104), and computes the threshold rate demand packet count (106). In one implementation, path rate detection module 88 stores these computed values in the control block object associated with the data flow for access by other modules, such as packet processor 82. The timing as to when path rate detection module 88 computes these values depends on which packets are used to estimate the initial rate demands and the threshold rate demand packet count. As FIG. 4 shows, in one implementation, the target rates (in one implementation, also stored in the control block object) for both the client-to-server ($TR_c$), and server-to-client ($TR_s$) directions are set to a fraction of the corresponding initial rate demands ($D_s$, $D_c$) (108).

Thereafter, as packets are received in either the client-to-server or server-to-client directions, packet processor updates the corresponding packet count for that direction ($PC_x$, where x equals either c or s). As FIG. 4 illustrates, as either of the packet counts crosses various thresholds (110, 112, 114) based on the threshold rate demand packet count, packet processor 82, in one implementation, overwrites the corresponding target rate, $TR_x$, in the control block object associated with the flow to a new value (111, 113, 115), up to the initial rate demand (115). As discussed above, the bandwidth allocations determinations made by flow control module 84 are based in part on the target rate assigned to the data flow, which gradually increases as more packets are received in the inbound and outbound directions. By constraining the target rate based on the modeled dynamics of the TCP (or other protocol) slow start mechanism, implementations of the present invention reduce the over-allocation of bandwidth to the data flows while in the slow start phase. In one implementation, after the threshold rate demand packet count is exceeded, flow control module 84 may overwrite the target rate based on applicable policy and/or partition parameters, and on feedback provided by monitoring actual bandwidth utilization for the data flow.

In addition, as FIG. 4 also illustrates, traffic management device 30, in one implementation, also adapts to circumstances where the sending host may re-initiate its slow start transmission phase. For example, according to the TCP protocol, a TCP transmitter will re-initiate its slow start mechanisms for a given flow, and re-transmit a given data segment for which an acknowledgment has not been received within a threshold period of time. In one implementation, traffic management device 30, in response to a detected re-transmission of data (122), also re-starts the mechanism for assigning a target rate to the flow based on the initial rate demand and the packet count. For example, as to TCP flows, traffic management device 30 determines whether a TCP transmitter has re-initiated the slow start mechanism by first comparing the last packet time to the arrival time of the latest packet. If the time difference between the arrival time of the last packet and the current packet is greater than a threshold time parameter, traffic management device 30 then determines whether the sequence number in the TCP header of the latest packet is the same as that in a previous packet corresponding to the flow. If so, traffic management device 30 assumes that a Retransmit Timeout has occurred at the TCP transmitter, causing it to re-transmit the data. Traffic management device 30 can base the value of the threshold time parameter on the round trip times (RTT) associated with the flow as observed at traffic management device 30 (see above), and the known behaviors of the Retransmit Timeout Mechanisms of TCP transmitters. As FIG. 4 illustrates, if a retransmission of data in response to a timeout occurs (122), traffic management device 30 resets the packet count ($PC_x$) corresponding to the direction of the packets and restarts the target rate assignment for the data flow as described above. Other protocols may require different techniques for determining whether a sending host has re-initiated its slow-start phase. For example, other protocols may include a flag in packet headers indicating that the packet is a retransmission of a previously sent packet. Accordingly, one skilled in the art will recognize that the methods for determining whether the sending host has restarted the slow start mechanism depends on the transport layer or other connection protocol employed.

A.5.a. Integration into Traffic Management Operations

Figure 6:
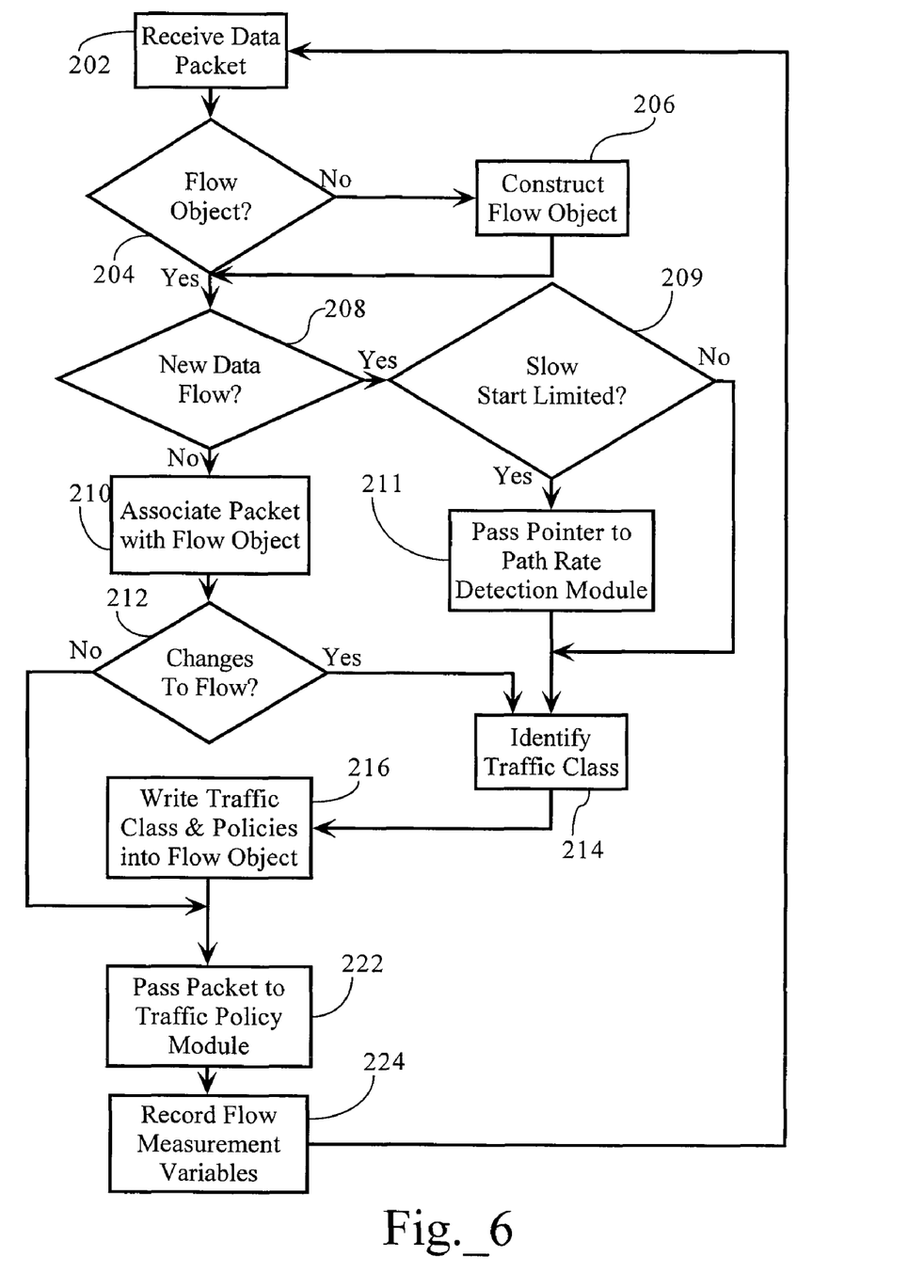
FIG. 6 is a flow chart diagram showing a method, according to an embodiment of the present invention, directed to the enforcement of bandwidth utilization controls on data flows traversing the traffic management device.

FIG. 6 illustrates a method, according to an embodiment of the present invention, directed to a flow-aware process that receives incoming flows, classifies them, and applies one or more traffic policies based on the identified traffic class. As FIG. 6 illustrates, a packet processor 82 receives a data packet (202) and determines whether a flow object has already been created for the flow to which the data packet is a part (204). A flow object, in one implementation, is a data structure including fields whose values characterize various attributes of the flow, including source and destination IP addresses, port numbers, traffic class identifiers and the like. A flow object can also include other attributes, such as packet count, byte count, first packet time, last packet time, etc. If a flow object is not found, packet processor 82 constructs a new flow object (206). Packet processor 82 then determines whether the received packet is part of an existing flow or a new data flow (208). In typical network deployments, flows are generally TCP or UDP flows. However, any suitable transport layer flow can be recognized and detected. In one embodiment, flows are identified based on the following flow attributes: 1) source IP address, 2) destination IP address, 3) source port number, 4) destination port number, and 5) protocol (derived from the "protocol" field in IPv4 headers, and the "Next-Header" field in IPv6 headers). One skilled in the art will recognize that flows can be identified in relation to a variety of attributes and combinations of attributes. In addition, methods for determining new data flows and assigning packets to existing data flows are well known in the art and also depend on the particular transport layer protocol employed. For a TCP flow, for example, packet processor 82 can determine a new data flow by detecting SYN, SYN/ACK, and/or ACK packets. However, a new data flow, depending on the network protocol associated with the flow, can simply be a data flow for which there is no corresponding flow object. For example, with UDP and GRE flows (where there is no explicit connection mechanism, such as SYN packets), a new flow is recognized by associating the source and destination addresses and port numbers to the flow and the flow type (e.g., UDP, GRE, etc.). Accordingly, when a UDP packet identifies a new address/port pair, the attributes discussed above are stored in a data structure along with the time of last packet. A new UDP flow between the same address/port pairs can be determined by comparing the last packet time to a threshold value (e.g., 2 minutes). If the difference between the time of the last packet and the time of the current packet is greater than the threshold, the current packet is deemed part of a new flow. In another implementation, a background and/or separate process can periodically compare the last packet times associated with a flow to a threshold period of time and deem the flow terminated if the last packet time is beyond the threshold period of time.

If the packet is part of an existing flow, the packet processor 82 associates the packet with the corresponding flow object and updates flow object attributes as required (210). For example, the packet processor 82, in one embodiment, increments the packet count corresponding to the direction of the packet, associated with the flow, as well as other parameters such as the last packet time. In addition, as discussed above, packet processor 82 may overwrite the target rate if the packet count exceeds a given threshold. In one implementation, packet processor 82 includes logic that distinguishes between "slow-start-limited" flows, and other flows (e.g., UDP flows) to ensure that only the target rates for slow-start-limited flows are adjusted.

If the packet represents a new data flow, packet processor 82 passes a pointer to the control block object corresponding to the flow to path rate detection module 88 (211), if the data flow is of a type that uses slow start mechanisms, such as TCP flows (209). Path rate detection module 88, in a separate process, observes the packet arrival times discussed above and computes the initial rate demand and threshold rate demand packet counts, as discussed above. Traffic classification database 86 also operates on the flow object and, potentially, attributes of the packet and other packets associated with the flow to determine a traffic type and/or traffic class associated with the flow (214). In one embodiment, the packet (or a pointer to the packet stored in a buffer structure) and the flow object (or a pointer thereto) is passed to the traffic classification database 86 to determine a traffic class. As discussed herein, identification of a traffic class or type can employ information gleaned from Layers 2 thru 7 of the OSI reference model. The determination of traffic classes is discussed in more detail in Sections A.1. and A.2., above. Similarly, if the packet represents a change to the data flow (212), packet processor 82 passes the packet and flow object to the traffic classification database 86 to determine the traffic class. Methods for determining changes to data flows are also well known in the art. For example, an email may include an attached digital image file. Accordingly, while the initial packets in the data flow may include simple text data, subsequent packets may contain image data. Packet processor 82, in one embodiment, is operative to detect such changes in the characteristics of the data flow by examining data encapsulated in upper layers of each packet, such as the detection of MIME types, etc.

As discussed above, to identify a traffic class associated with the data flow, packet processor 82 passes the flow object (or a pointer to the control block object) to traffic classification database 86. In one embodiment, the control block object or a copy of it is stored in association with the packet and in the same buffer structure to facilitate access to the control block object by traffic classification database 86. As discussed in more detail below, traffic classification database 86 operates on attributes of the flow object, (and potentially on the packet stored in the buffer structure) to identify traffic class(es) associated with the data flow (214). In one embodiment, the flow object includes a pointer to the identified traffic class(es) in traffic classification database 86. In one embodiment, the traffic classification database 86 stores in the flow object the traffic management policy parameters (e.g., policy parameters, partition parameters, etc.), if any, associated with the identified traffic classes (216).

Packet processor 82 then passes the packet to flow control module 84 (222) which accesses the flow object corresponding to the data flow to retrieve traffic management policies associated with the traffic class and enforces the identified traffic policy(ies) on the data packet flow. As FIG. 6 illustrates, measurement engine 140 also records or updates various measurement values associated with the packet to allow for analysis of bandwidth utilization and other network statistics on a traffic class or aggregate basis.

Lastly, although the present invention has been described as operating in connection with end systems and networks primarily employing the HTTP, TCP and IP protocols, the present invention has application in computer network environments employing any suitable network protocol suite that employs slow-start mechanisms. In addition, while, in the embodiments described above, the operations associated with the present invention are distributed across various modules, a variety of other implementations featuring different distributions of the operations are possible. For example, the flow control module 84 can be configured to adjust the target rate as the packet counts exceed various thresholds. Accordingly, the present invention has been described with reference to specific embodiments. Other embodiments of the present invention will be apparent to one of ordinary skill in the art. It is, therefore, intended that the claims set forth below not be limited to the embodiments described above.

What is claimed is:

1. A method comprising
detecting, at a network device operably connected to a link in a network, a first transport layer data flow corresponding to a first host and a second host among a plurality of transport layer data flows transmitted across the link;
estimating, at a start of the first transport layer data flow between the first host and the second host, an initial rate demand for the first transport layer data flow, wherein the first host and the second host implement, relative to the first transport layer data flow, a protocol that utilizes a slow-start phase, wherein the initial rate demand is an estimated rate capacity for the first transport layer data flow of a communications path between the first and second host, wherein the communications path includes the link;
allocating bandwidth of the link to a plurality of data flows including assigning a target rate to the first transport layer data flow wherein the target rate is less than the initial rate demand for the first transport layer data flow;
enforcing, at the network device, the target rate on the first transport layer data flow;
maintaining a count of packets associated with the first transport layer data flow; and
increasing the target rate allocated to the first transport layer data flow, if the count of packets associated with the first transport layer data flow exceeds at least one threshold.

2. The method of claim 1 further comprising
estimating the number of bytes that the first host will transmit before achieving the initial rate demand; and
setting the at least one threshold based on the number of bytes in the second estimating step.

3. The method of claim 2 wherein the second estimating step comprises
estimating the round trip time between the first and second host; and
multiplying the initial demand rate associated with the first transport layer data flow by the round trip time.

4. The method of claim 3 wherein the round trip time is based on an analysis of arrival times of handshake packets corresponding to the first transport layer data flow.

5. The method of claim 1 wherein the initial rate demand is based on an analysis of arrival times of at least one handshake packet corresponding to the first transport layer data flow.

6. The method of claim 5 wherein the initial rate demand is based on an analysis of at least one data packet corresponding to the transport layer data flow.

7. The method of claim 1 wherein the initial rate demand is based on an analysis of at least one data packet corresponding to the first transport layer data flow.

8. The method of claim 1 further comprising
monitoring for at least one indication that the sending host has re-initiated the slow start mechanism for the first transport layer data flow;
upon detection of at least one of the indications,
resetting the count of the packets for the first transport layer data flow; and
repeating the allocating, maintaining and increasing steps.

9. The method of claim 8 wherein the monitoring step comprise
determining whether at least one data packet corresponding to the first transport layer data flow is a re-transmission of a previous packet.

10. The method of claim 9 wherein the monitoring step further comprises
determining whether the re-transmitted packet arrived a threshold period of time after the last packet corresponding to the first transport layer data flow.

11. The method of claim 8 wherein the monitoring step comprise determining whether the packet arrived a threshold period of time after the last packet corresponding to the first transport layer data flow.

12. A method comprising
detecting, at a network device operably connected to a link in a network, a first transport layer data flow corresponding to a first host and a second host among a plurality of transport layer data flows transmitted across the link;
estimating, at a start of the first transport layer data flow between the first host and the second host, an initial rate demand for the first transport layer data flow, wherein the first host and the second host implement, relative to the first transport layer data flow, a protocol that utilizes a slow-start phase, wherein the initial rate demand is an estimated rate capacity for the data flow of a communications path between the first and second host, wherein the communications path includes the link;
allocating bandwidth of the link to a plurality of data flows including assigning a target rate to the first transport layer data flow wherein the target rate is a fraction of the initial rate demand for the first transport layer data flow;
enforcing, at the network device, the target rate on the first transport layer data flow;
maintaining a count of transmitted bytes associated with the first transport layer data flow; and
increasing the target rate allocated to the first transport layer data flow, if the count of transmitted bytes associated with the first transport layer data flow increases.

13. The method of claim 12 wherein the increasing the target rate comprises increasing the fraction of the initial rate demand allocated to the first transport layer data flow as the count of transmitted bytes crosses at least one threshold.

14. The method of claim 13 further comprising
estimating the number of bytes that the first host will transmit before achieving the initial rate demand; and setting the at least one threshold based on the number of bytes in the second estimating step.

15. The method of claim 14 wherein the estimating the number of bytes comprises
estimating the round trip time between the first and second host; and
multiplying the initial demand rate associated with the first transport layer data flow by the round trip time.

16. An apparatus comprising:
a packet processor operative to
detect, among a plurality of transport layer data flows, a first transport layer data flow in network traffic traversing a link in a communications path between a first host and a second host, wherein the first host and the second host implement, relative to the first transport layer data flow, a protocol that utilizes a slow-start phase;
maintain a count of packets or bytes associated with the first transport layer data flow;
a path rate detection module operative to
estimate the initial rate demand for the first transport layer data flow, wherein the initial rate demand is an estimated rate capacity for the first transport layer data flow of a communications path between the first and second host;
a bandwidth allocation module operative to
allocate bandwidth of the link to a plurality of transport layer data flows including allocating bandwidth to the first transport layer data flow based in part on a target rate associated with the first transport layer data flow; and
wherein the apparatus is operative to
set a target rate for the first transport layer data flow wherein the target rate is less than the initial rate demand for the first transport layer data flow; and
increase the target rate associated with the first transport layer data flow, if the count of packets or bytes associated with the first transport layer data flow exceeds a threshold value.

17. The apparatus of claim 16 further comprising
a traffic classification database including at least one traffic class, at least one attribute defining the at least one traffic class, and at least one bandwidth utilization control corresponding to the at least one traffic class, wherein the traffic classification is operative to
compare attributes stored in association with traffic class identifiers to attributes of the first transport layer data flow to identify a traffic class that corresponds to the first transport layer data flow;
associate at least one bandwidth utilization control to the first transport layer data flow based on the identified traffic class; and
wherein the bandwidth allocation module is operative to allocate bandwidth based, at least in part, on the target rate, and the at least one bandwidth utilization control, associated with the first transport layer data flow.

18. The apparatus of claim 16 wherein the packet processor is further operative to parse at least one packet associated with the first transport layer data flow into a flow specification, wherein said flow specification contains at least one instance of any one of the following: a protocol family designation, a direction of packet flow designation, a protocol type designation, a pair of hosts, a pair of ports, a pointer to a MIME type a pointer to an application-specific attribute.

19. The apparatus of claim 18 wherein the traffic classification database is operative to match the first transport layer data flow specification to a plurality of traffic classes, each of the traffic classes defined by one or more matching attributes; and thereupon,
having found a matching traffic class in the matching step, associate said transport layer data flow specification with a traffic class from the plurality of traffic classes.

20. The apparatus of claim 16 wherein the apparatus is further operative to monitor for at least one indication that the sending host has re-initiated the slow start mechanism for the first transport layer data flow; and
upon detection of at least one of the indications,
reset the count of bytes for the transport layer data flow; and
reset the target rate for the first transport layer data flow to the initial target rate.

21. The apparatus of claim 16 wherein the path rate detection module is further operative to estimate the number of bytes that a sending host will transmit before achieving the initial rate demand.

22. A method comprising
allocating a limited amount of bandwidth to a plurality of transport layer data flows traversing a network between respective first and second hosts based on target rates associated with the transport layer data flows; and
in response to detection of and for each data flow of at least a subset of the data flows,
estimating an initial rate demand for the transport layer data flow between a first host and a second host, wherein the first host and the second host implement, relative to the transport layer data flow, a protocol that utilizes a slow-start phase, wherein the initial rate demand is an estimated rate capacity for the data flow of a communications path between the first and second host;
setting a target rate to the transport layer data flow wherein the target rate is less than the initial rate demand for the transport layer data flow;
maintaining a count of packets associated with the transport layer data flow; and
increasing the target rate of the transport layer data flow, if the count of packets associated with the transport layer data flow exceeds at least one threshold.

* * * * *